H. J. LUDEKE.
APPARATUS FOR SPLITTING MEAT CARCASSES.
APPLICATION FILED JUNE 5, 1915.
1,181,397. Patented May 2, 1916.
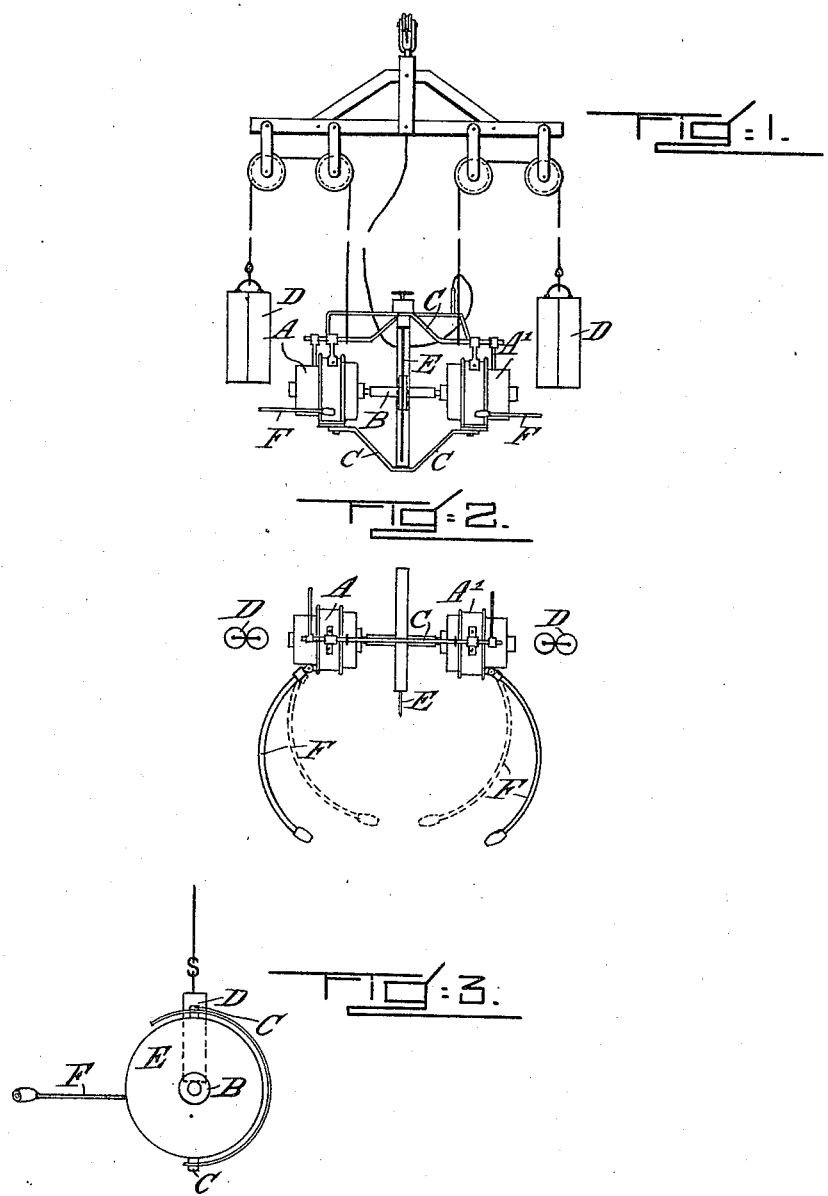
INVENTOR:
Henry Joseph Ludeke
By M. Wallace White
ATTY.

UNITED STATES PATENT OFFICE.

HENRY JOSEPH LUDEKE, OF RIVERSTONE, NEW SOUTH WALES, AUSTRALIA.

APPARATUS FOR SPLITTING MEAT CARCASSES.

1,181,397.  Specification of Letters Patent.  Patented May 2, 1916.

Application filed June 5, 1915. Serial No. 32,271.

*To all whom it may concern:*

Be it known that I, HENRY JOSEPH LUDEKE, a subject of the King of Great Britain and Ireland, residing at Riverstone, New South Wales, Australia, have invented new and useful Improvements in Apparatus for Splitting Meat Carcasses, of which the following is a specification.

This invention is intended to economize labor in slaughter houses and is specially adapted to split beef carcasses. In giving effect to the invention, two motors, preferably electric, on the same axial shaft, with suitable controls, are suspended from above and counterweighted so that the motors may be easily raised and lowered. The motors will be connected together by a skeleton frame, in such a way that a carcass can be introduced into the space between the motors from one side only. Upon that part of the axial shaft between the two motors a circular saw will be mounted. The carcass will be suspended at a suitable height, the sawing apparatus being lowered and pulled by conveniently placed handles, against the carcass, so that the saw shall impinge against it at the longitudinal center of the backbone, until the carcass has been split into two parts of equal size.

In the accompanying drawings:—Figure 1, is a front elevation of the apparatus. Fig. 2, is a plan of the same. Fig. 3, is a sectional elevation of the saw, the front motor being removed.

The motors A, A', upon the same axial shaft B, with suitable controls, are mounted on a frame C, which is suspended from above and maintained in any desired position by the counterweights D, in a manner that is well understood. On the center of the common shaft B is keyed a circular saw E, by means of which the carcass will be split. Movable handles F, will project from the front sides of the motors A, A', or of the frame C, the same being so mounted that they may be opened out wide to admit the carcass, or be placed in any suitable position whereby they may be manipulated in order to effect the object in view viz:—to split the carcass by means of the saw. The latter, instead of being made of metal of uniform thickness, should, preferably, taper from the center to the circumference where the teeth will be cut.

I claim—

An implement for splitting suspended carcasses consisting of a suspended and counter-balanced frame, a pair of motors supported by the frame in spaced relation, a common drive axle for the motors within the frame, a circular saw located upon the axle intermediately between the motors and a pair of bowed handle bars separately pivoted to the machine in such a manner that the handle bars may be opened outward to admit the carcass, and the saw may be directed and pushed or pulled to make the cut as desired.

In testimony whereof I have signed my name to this specification in the presence of two subscribing witnesses.

HENRY JOSEPH LUDEKE.

Witnesses:
A. MASSEY,
H. C. CAMPBELL.